United States Patent

[11] 3,616,082

[72] Inventor Robert F. Menary
 Northbrook, Ill.
[21] Appl. No. 726,426
[22] Filed May 3, 1968
[45] Patented Oct. 26, 1971
[73] Assignee Paulmar, Inc.
 Northfield, Ill.

[54] FILM SPLICER
 14 Claims, 7 Drawing Figs.
[52] U.S. Cl. ................................................ 156/509
[51] Int. Cl. ........................................... G03d 15/04
[50] Field of Search ...................................... 156/502
 –510, 517, 535, 503, 527, 157, 159, 576,
 580; 242/58.1–58.4, 59; 292/251.5

[56] References Cited
UNITED STATES PATENTS
1,934,417 11/1933 Franzen et al. ............... 156/508
2,290,115 11/1942 Mokin ........................... 156/509
2,544,082 3/1951 Hancock et al. ............... 156/509
2,621,706 12/1952 Jirouch ......................... 156/508
2,850,072 9/1958 Bryans .......................... 292/251.5

Primary Examiner—Robert F. Stahl
Attorney—Greist, Lockwood, Greenawalt & Dewey

ABSTRACT: An apparatus for splicing motion-picture film which comprises a supporting frame or base on which two pairs of film-clamping plates are mounted in alignment on opposite sides of a filmcutting wheel and emulsion-scraping roller with the top plate of one pair and both plates of the other pair thereof being mounted for pivotal movement on axially aligned shafts so as to enable the plates of each pair thereof to be opened for clamping the end section of a film between the same and with the one pair of plates adapted to be swung, while clamping a film section, in an upward path so as to avoid interference with movement of the other pair of plates which are mounted on a laterally movable carriage, said carriage being adapted to be reciprocated so as to pass the end of a film clamped between the plates beneath the cutting wheel and emulsion scraper to cut off the projecting end portion of the film and scrape off the emulsion in the margin thereof thereby providing a clean area for the application of an adhesive for forming the splice. Lowering the other pair of plates into alignment with the carriage mounted plates automatically trims the ends of both film sections which are clamped in the plates and effects the necessary overlap of the trimmed ends to form the splice.

INVENTOR
ROBERT F. MENARY
BY
ATTYS.

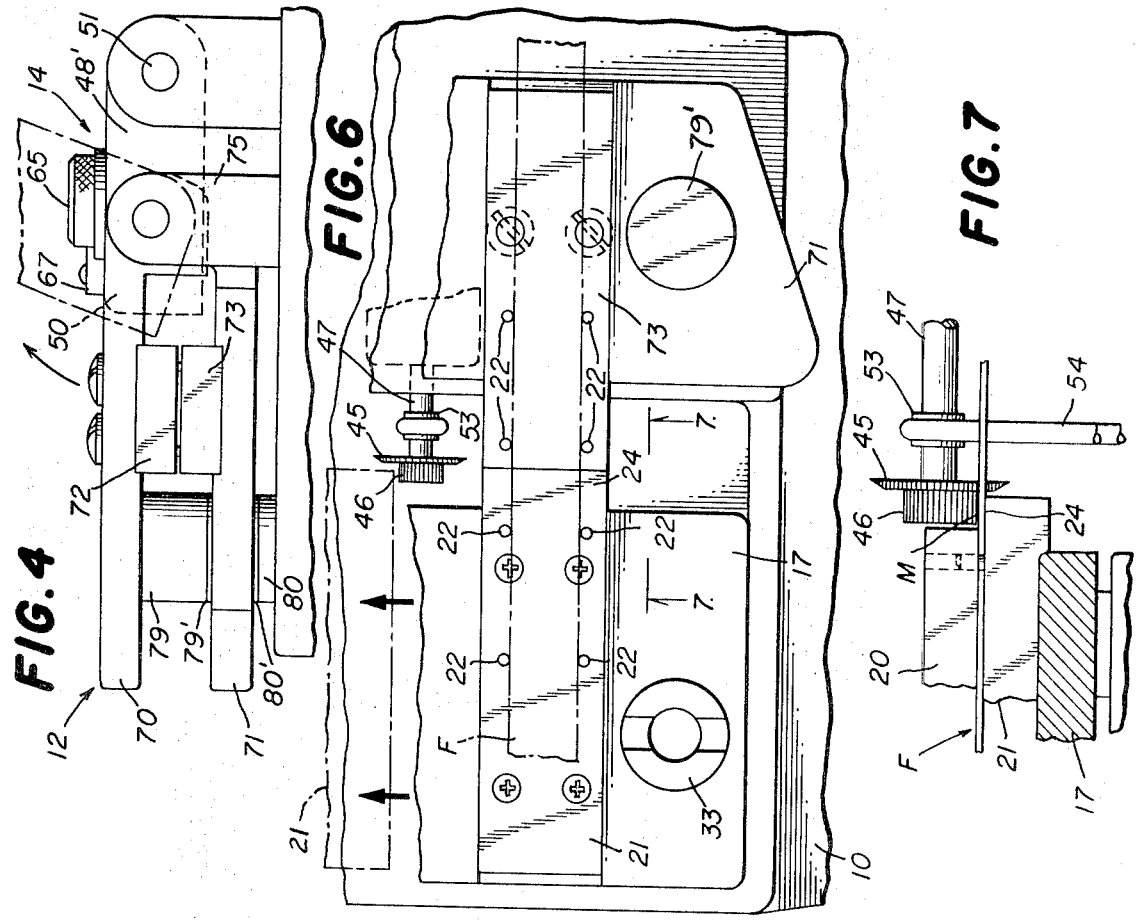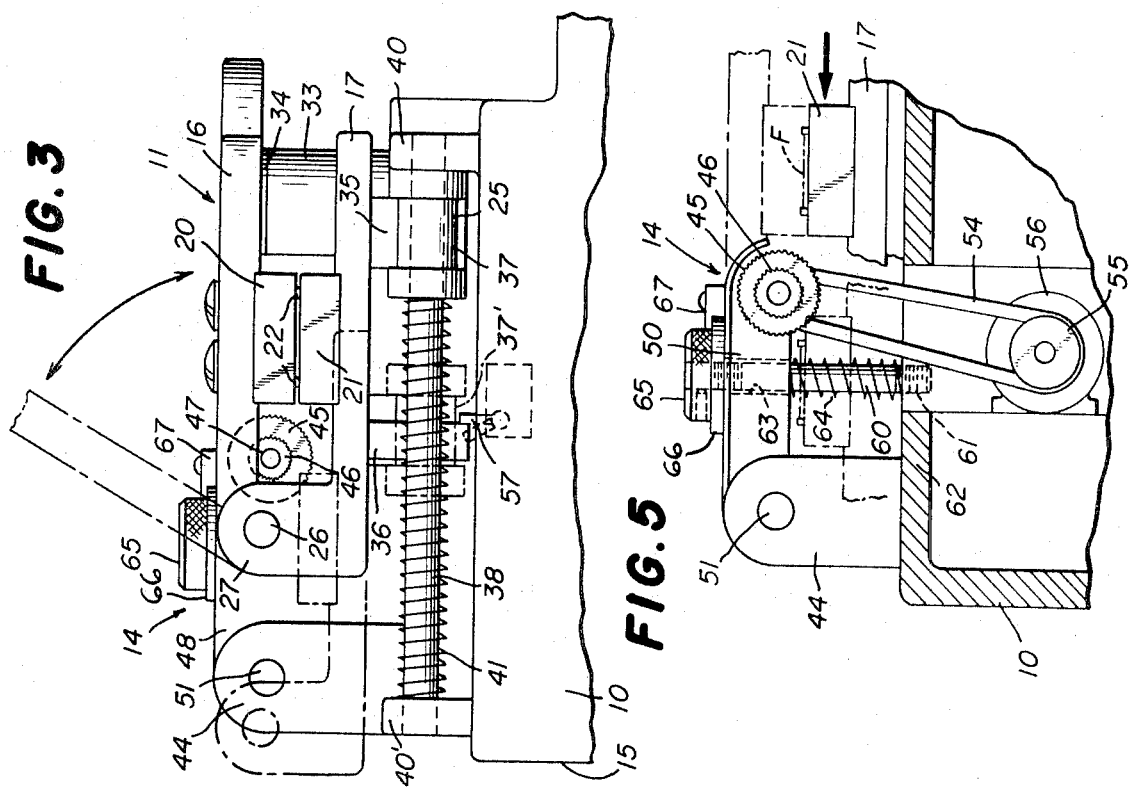

FILM SPLICER

This invention relates to film-handling apparatus and is more particularly concerned with improvements in an apparatus for use in splicing motion-picture film.

Apparatus has been provided heretofore for use in splicing motion-picture film which has employed swingably mounted plates for clamping the film ends which are to be spliced and in some apparatus of this character the film-clamping plates or holding assemblies have associated therewith a means for trimming the ends of the film sections. In one form of apparatus a scraper is provided on a movable carriage which is operated to traverse the end of the film while the latter is clamped in a fixed position. The prior-developed apparatus which has been available has not been entirely satisfactory generally because adequate provision has not been made for holding the film while it is worked upon and a satisfactory arrangement has not been provided for scraping the emulsion from the surface with a sufficient degree of accuracy to insure a clean area for application of adhesive. It is an object, therefore, of the present invention to provide an improved film splicer which has adequate provision for clamping the film, for trimming the same and for scraping the margin where the splice is to be made so as to remove the emulsion and provide a clean area for application of adhesive.

It is a more specific object of the invention to provide a film-splicing apparatus in which the film is adapted to be clamped between hinged clamping plates mounted on a movable carriage which carriage is adapted to be reciprocated in a path to bring the projecting end of the film into the path of a device for cutting off projecting end portions of the film and removing emulsion prior to effecting the splice.

It is another object of the invention to provide in a film-splicing machine having hingedly mounted film-clamping plates and a combination cutting and scraping device which is mounted adjacent the film-clamping plates so that the projecting end of a film may be clamped in the plates and moved into the path of the cutting and scraping device to cut off projecting portions of the film and simultaneously remove the emulsion from a splice forming area adjacent the end edge.

It is a further object of the invention to provide in a film-splicing apparatus having hingedly mounted film-clamping plates a combination trimming and scraping wheel mounted adjacent the film-clamping plates and adjustable so that movement of the clamping plates in a reciprocating path will bring the end of the film into the path of the trimming and scraping device which operates in response to movement of the clamping plates to trim the edge of the film and scrape off the emulsion along a marginal portion thereof.

It is still another object of the invention to provide in a film-splicing apparatus two pairs of hingedly mounted film-clamping plates which are mounted for relative movement so that projecting ends of film sections clamped between the pairs of plates are automatically trimmed and the trimmed ends brought into overlapping relation for forming the splice by relative movement of the pairs of clamping plates.

Another object of the invention is to provide in a film-splicing apparatus hingedly mounted film-clamping members and magnetic latching means for releasably holding the film-clamping members in film-clamping position.

These and other objects and advantages of the invention will be apparent from a consideration of the film-splicing apparatus which is shown by way of illustration in the accompanying drawings wherein:

FIG. 3 is a side elevation of the film-splicing apparatus shown in FIG. 1, the view being taken on line 3—3 of FIG. 2;

FIG. 4 is a partial side elevation at the opposite side of the apparatus shown in FIG. 1;

FIG. 5 is a cross section, to an enlarged scale, taken on the line 5—5 of FIG. 1;

FIG. 6 is a horizontal sectional view taken on the line 6—6 of FIG. 2; and

FIG. 7 is a fragmentary section taken on the line 7—7 of FIG. 6, to an enlarged scale.

Figure 1:
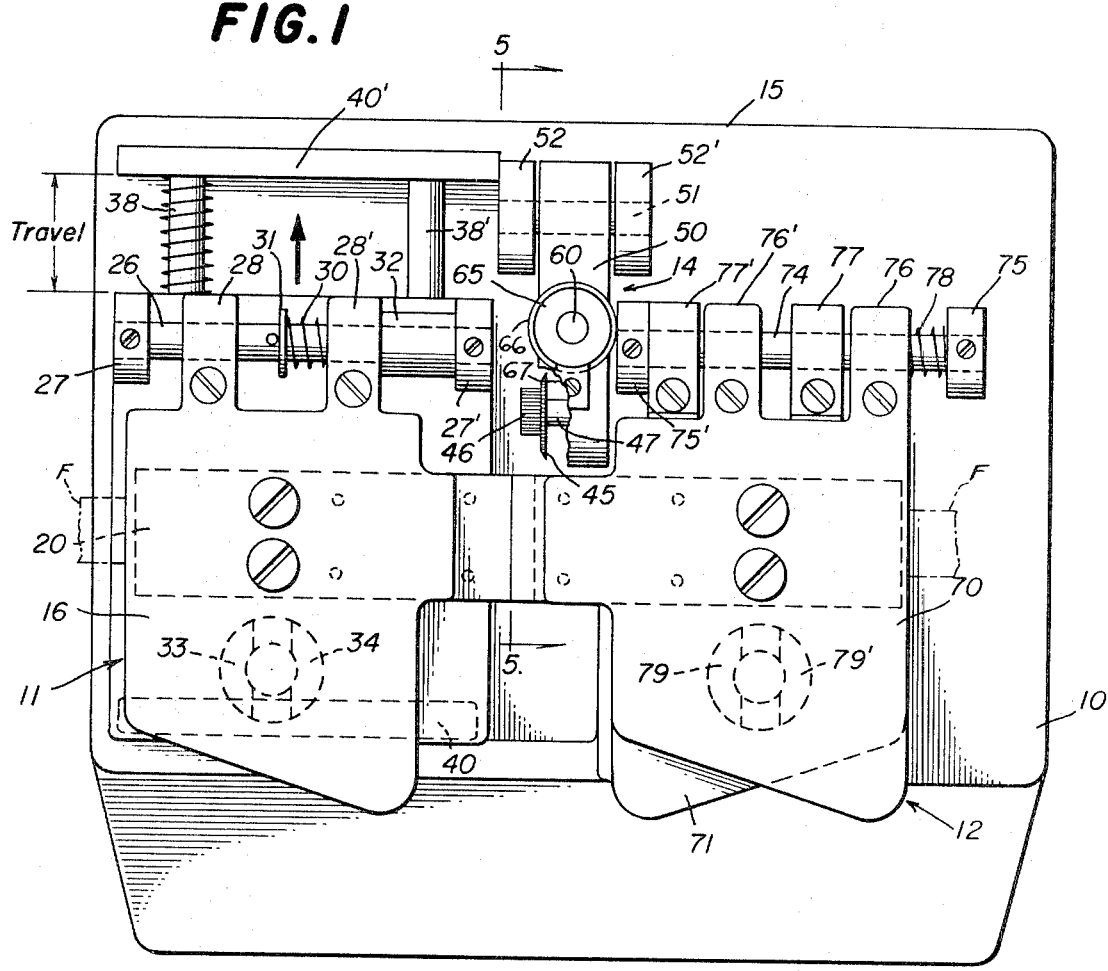
FIG. 1 is a plan view of an apparatus for splicing movie film which incorporates therein the principal features of the invention.
Figure 2:
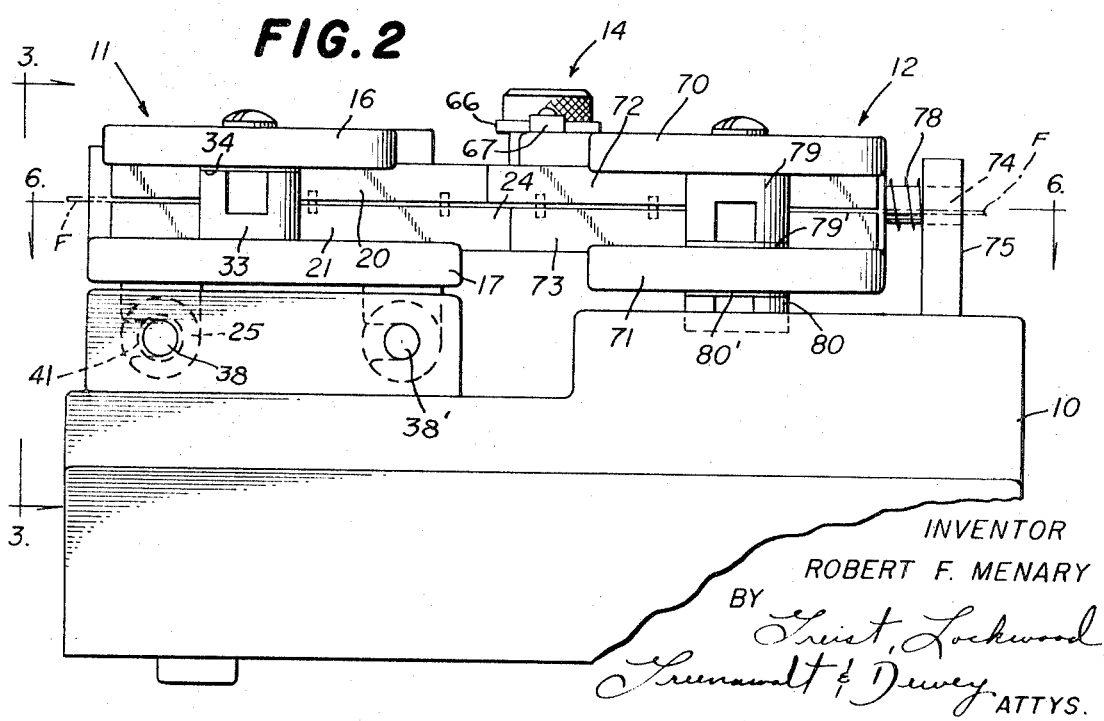
FIG. 2 is a front elevation, with portions broken away, of the film-splicing apparatus shown in FIG. 1.

Referring to the drawings, there is illustrated an apparatus for use in connecting the ends of movie film by trimming and splicing the same which embodies the principal features of the invention. The illustrated apparatus comprises a base 10 on which the operative elements of the apparatus are supported. Two film-clamping plate assemblies 11 and 12 are mounted on the top of the base frame 10 as viewed in FIGS. 1 and 2. The film clamping assemblies 11 and 12 are disposed on opposite sides of a film-trimming and emulsion-removing device 14 which is located near the rear side 15 of the base 10. The film-clamping assembly 11 which is to the left of the trimming and emulsion-removing device 14 in FIG. 1 is mounted for reciprocating movement in a horizontal plane, when the apparatus is placed on a table or similar supporting surface, so as to bring the projecting end portion of a section of film F clamped in the assembly into the zone of operation of the trimming and emulsion-removing device 14 in which is operative to trim off the end of the film and scrape a marginal portion M clean of emulsion for better application of adhesive so as to permit a more effective splice when the assembly 11 is returned to its initial position of alignment with the film-clamping assembly 12 on the right in FIG. 1 and to enable the end portion of a cooperating section of film clamped in the assembly 12 to be overlapped and adhered to the end portion of the film which is held in the movable clamping assembly 11.

The film-clamping assembly 11 comprises top and bottom film-clamping plates 16 and 17 which form carriers for film-engaging members 20 and 21. The rectangular members 20 and 21 are secured by screws or other suitable fastening means in vertically aligned, face-to-face relation in shallow recesses in the faces of the top and bottom clamping plates 16 and 17 which confront each other when the latter are in closed position as shown in FIG. 3 for clamping the film. The film-engaging, platenlike strip or plate members 20 and 21 are provided with a plurality of guide pins 22 on the top face of the bottom plate 21 and cooperating apertures in the top plate 20, which are spaced so as to confine the film between the same whereby the film is securely held and properly aligned when the clamping plates 16 and 17 are closed on the same. The bottommost film-engaging member 21 extends at the one end beyond the end of the topmost film-engaging member 20 to provide a platen or anvillike surface portion 24 (FIGS. 2 and 6) for cooperation with a film-removing device as hereinafter described. The bottom clamping plate 17 is fixed on, and forms the top portion of, a reciprocably mounted carriage 25 for the assembly 11. A small shaft 26 is secured between spaced upstanding bracket members 27, 27' at the rear of the bottom clamping plate 17 and the top clamping plate 16 is hingedly mounted on the shaft 26 by means of bearing ears 28, 28' extending from the rear edge of the top clamping plate 16. The top clamping plate 16 is resiliently held in proper axial position on the shaft 26 by a compression spring 30 extending between one of the hinge knuckles or bearing ears 28' on the plate 16 and a stop washer 31 on the shaft 26, which urges the plate ear 28' against a spacer sleeve 32 on the shaft 26. A magnet 33 is secured on the bottom film-clamping plate 17 and a cooperating metal plate 34 is secured on the top film-clamping plate 16 for releasably holding the top plate 16 in closed or clamping relation relative to the bottom clamping plate 17. The bottom clamping plate 17 has bracket-forming lugs depending from the bottom face 25 and 36 which are spaced in a front-to-back direction so as to accommodate between the same bearing forming members 37 and 37' slidably mounted on parallel track-forming rods 38 and 38' which extend between upstanding bracket forming flangelike members 40 and 40' at the front and rear on the top face of the base 10. A compression spring 41 is carried on the one track-forming rod 38 and urges the assembly toward the front of the base where it normally rests until manually reciprocated to trim and scrape the end of a film section F while the latter is held in clamped relation between the film-engaging members 20 and 21.

The film-trimming and emulsion-removing device 14 is mounted on an upstanding post formation 44 at the rear of the base 10. The device 14 comprises a cutting or trimming wheel or blade 45, which may have a sawtooth cutting edge and an emulsion removing scraper roller 46, both of which are mounted on a small shaft 47. The shaft 47 is journaled in the depending sidewall formations 48 and 48' of a hinged bracket 50 which is mounted in forwardly extending relation on a pivot 51 journaled in upstanding bearing ears 52 and 52' on the top of the post 44. The shaft 47 carries a pulley 53 which is connected by a small drive belt 54, of rubber or the like, with a drive pulley 55 on a drive motor 56 which is housed in a suitable manner in the base 10. Provision is made for supplying the motor 56 with current through a suitable circuit which includes a switch having an operating arm 57 extending in the path of the depending lug 36 on the reciprocating carriage 25. The supporting bracket 50 for the film-trimming blade 45 and associated scraper wheel 46 is adjustable about the pivot 51 so as to raise and lower the scraping wheel 46 relative to the horizontal plane of movement of the film-supporting platen portion 24 so as to adjust the depth or thickness of material the wheel 46 will scrape from the uppermost surface of the film which is exposed on the platen portion 24. A bolt 60 has relative fine threads on its bottom which engage in a cooperating threaded aperture 61 in the top wall section 62 of the base 10. The bolt 60 extends through a bore 63 in the bracket 50 and a compression spring 64 is carried on the bolt 60 between the top face of the base portion 62 and the bottom face of the bracket 50 so as to urge the latter into the uppermost position. The bolt has a relatively coarse thread adjacent the head 65 on which there is threaded a nut forming member 66 which, when free, may be turned to provide initial or coarse adjustment of the bracket 50 after which it is locked to the bracket 50 by a clamping bracket 67. A fine adjustment may then be had by turning the bolthead 65.

The film-clamping assembly 12 which is mounted on the other side of the base 10 comprises a pair of platelike, top and bottom, film-clamping members 70 and 71 which form carriers for elongate film-engaging plates 72 and 73 of rectangular form. The film-engaging plates 72 and 73 are of the same character as the plates 20 and 21 and are disposed, when in the normal film-clamping position, in longitudinal alignment with the plates 20 and 21. The bottom plate 71 has spaced film guide pins 22 and the top plate 70 has cooperating apertures spaced in the same manner and aligned with the guide pins on plate 21. The clamping plates 70 and 71 are swingably mounted on a shaft 74 extending between upstanding brackets forming bearing members 75 and 75' on the top of the housing 10 which support the shaft 74 in axial alignment with the shaft 26 on the opposite side of the base 10. Hinge knuckles or bearing ears 76, 76' and 77, 77' extend from the back edges of the two clamping plates 70 and 71, respectively, and hingedly connect the latter to the shaft 74. A compression spring 78 on the shaft 74 holds the plates 70 and 71 in proper axial position on the shaft 74. At the forward edge of the apparatus a magnet 79 and a cooperating magnet plate 79' are provided on the confronting faces of the hinged plates 70 and 71 to hold the two film-clamping plates 70 and 71 in closed position, as shown in FIG. 4. In like manner magnet 80 and cooperating magnet plate 80' are provided on the top face of the base and confronting bottom face of the plate 71 to hold the entire assembly 12 in the horizontal position on the top face of the base 10. The film-engaging members 72 and 73 extend at their ends so as to mate with the ends on the film-clamping plates 20 and 21 with the marginal portion of the topmost plate 72 overlying the platen-forming portion 24 of the lowermost film-engaging plate 21 on the film-clamping assembly 11 when the assemblies 11 and 12 are in the position shown in FIGS. 1 and 2. When the assembly 12 is swung from the position shown in dot dash line in FIG. 4 to the position shown on FIGS. 1 and 2, the bottom inner end edge of plate 73 cooperates with the top inner end edge of the plate 21 to shear cut or trim the end of the film clamped in assembly 11 and at the same time the bottom inner end edge of the plate 72 cooperates with the top inner edge of the plate 20 to trim the end of the film clamped in assembly 12. The film-clamping assembly 12 is, of course, employed to hold the end portion of the film section clamped therein with the end margin overlying the cleaned area at the end of the film section in the clamping assembly 11 so as to enable the operator to form splices which are of substantially uniform character.

The operation of the apparatus will be evident in part from the detailed description thereof. When a broken film is to be spliced or the ends of two film sections are to be joined the one film section is clamped between the film-engaging plates 72 and 73 of the right-hand clamping assembly 12, as viewed in FIGS. 1 and 2, with the emulsion side of the film upper most and with the end projecting beyond the end of film-engaging plate 72 after which the assembly 12 is swung upwardly to an out of the way position, indicated in dot-dash lines in FIG. 4. The other film section is then clamped between the film engaging plates 20 and 21 of the left-hand clamping assembly 11, with the emulsion side uppermost. The assembly 11 is reciprocated to bring the end of the film into the zone of operation of the sawlike trimming blade 45 and the emulsion-removing wheel 46 so as to trim the projecting end portion of the film and simultaneously remove the emulsion in the marginal area adjoining the trimmed end as indicated in FIG. 7. Upon returning the film assembly 11 to its normal forward position an adhesive may be applied to the cleaned end portion of the film section after which the film-clamping assembly 12 may be swung down to overlap the ends of the film sections and form the splice. The lowering of the right-hand assembly 12 results in a final trimming of the ends of both the film sections which project beyond the inner edges of the film-engaging plates 21 and 72, respectively. The bottom end edges of the plates 73 and 72 cooperate with the top end edges of the film-engaging plates 21 and 20, respectively, to shear the ends of the film sections which are clamped in the two assemblies 11 and 12. The spliced film may be removed from the film clamping assemblies 11 and 12 as soon as the adhesive has set.

While particular materials have been referred to and specific details of construction have been shown in the drawings which illustrate the invention it will be understood that other suitable materials and equivalent structural details may be resorted to within the spirit of the invention.

I claim:

1. In an apparatus for use in splicing movie film, a supporting base, a film-holding assembly comprising a pair of hingedly connected film-clamping members, a reciprocably mounted carriage for said film-clamping members, a track formation for said carriage in said supporting base on which the carriage is mounted for linear reciprocation, and a combination film-cutting and emulsion-removing device mounted at a fixed point in the path of movement of the end of a film held between said film clamping members which film-cutting and emulsion-removing device is operative upon predetermined reciprocation of said carriage with a film end section held in said film-clamping members to trim the end of the film and to remove emulsion from an area of the top surface adjoining the trimmed end portion of the film.

2. In a film-splicing apparatus having a supporting frame, a film-holding assembly comprising hingedly related film-clamping members, a carriage supporting said film-clamping members, means mounting said carriage and said film-clamping members for reciprocating in a predetermined lineal path extending laterally of the longitudinal axis of an end section of film held between said clamping members, and a combination film-trimming and emulsion-removing device mounted adjacent said carriage-mounting means so that it is disposed in the path of the end section of the film and is operative to trim the end of the film and remove emulsion from the margin at the trimmed end when the carriage is reciprocated and the end of the film is moved past said device.

3. In a film-splicing apparatus as set forth in claim 2, and power means for operating said film-trimming and emulsion-removing device which is actuated in response to movement of said carriage.

4. In a film-splicing apparatus as set forth in claim 2, and said film-clamping members being in the form of a pair of film-engaging plates hingedly connected along a side edge thereof.

5. In a film-splicing apparatus as set forth in claim 2, and said film-clamping members being in the form of elongate platelike film-engaging strips mounted in face-to-face relation upon confronting faces of carrier plates which are hinged to each other along a side edge.

6. In a film-splicing apparatus as set forth in claim 5, and said elongate platelike film-engaging strips having cooperating means thereon for confining the film on a predetermined position when the film is clamped between the same so as to hold the film against movement.

7. In a film-splicing apparatus as set forth in claim 5 and the platelike film-engaging strip which is on the bottommost carrier plate having the end thereof extending an appreciable distance beyond the end of the topmost platelike film-engaging strip so as to support the film as it is moved beneath said film-trimming and emulsion removing device.

8. In a film-splicing apparatus as set forth in claim 5, and one of said carrier plates being in fixed relation on said carriage for reciprocation with said carriage and the other one of said carrier plates being hingedly connected to said first carrier plate.

9. In a film-splicing apparatus as set forth in claim 5, and said film-trimming and emulsion-removing device comprising a trimming blade and an emulsion-removing wheel, a rotatably mounted shaft supporting said blade and wheel, a power drive for said supporting shaft, and means for adjusting the position of said supporting shaft relative to the path of travel of said carriage so as to control the amount of material removed from the film section by the emulsion-removing wheel.

10. In a film-splicing apparatus as set forth in claim 2, and means for driving said film-trimming and emulsion-removing device which is operative in response to the reciprocation of said carriage.

11. In a splicing apparatus for film, or like tape, a supporting base, a pair of aligned film-clamping assemblies each having a pair of clamping plates hingedly connected along a side edge and adapted to hold a section of film between the same when closed on each other, a carriage supporting one of said film clamping assemblies, means mounting said carriage for reciprocation in a predetermined lineal path extending laterally of an end section of film held between the clamping plates on said carriage, a combination film-trimming and emulsion-removing device mounted in the path of said film end section which is operative to trim the end of the film and remove emulsion from the trimmed end when the end of the film is moved past the same by reciprocation of said carriage, and means for releasably holding the clamping plates in closed film clamping position comprising a magnet on the one plate and a cooperating member which is attracted thereby on the other plate.

12. In a splicing apparatus as set forth in claim 11, and one of said film-clamping assemblies being hingedly mounted to swing as a unit in said supporting base and having means for releasably holding the entire assembly in a generally horizontal position on the base when the base is disposed on a generally horizontal surface, and said releasable holding means comprising a magnet fixed on the base and a cooperating member which is attracted thereby on the assembly.

13. In a splicing apparatus for film or like tape, a supporting base, a pair of longitudinally aligned film-clamping assemblies each having a pair of film engaging plates mounted for hinging movement along corresponding side edges and the plates of each pair thereof being adapted, when closed on each other, to clamp a section of film between the same with the ends extending at the inner ends of the film-engaging plates and in axial alignment longitudinally thereof, one pair of said film-engaging plates being mounted to swing as a unit upwardly out of alignment with the other pair of said film-engaging plates, the inner end of each film-engaging plate of each pair thereof being offset relative to the corresponding end of the associated film-engaging plate, the inner end of each of said film-engaging plates mating with the corresponding end of the corresponding plate in the other pair thereof and the end edges cooperating when said one pair of said film-engaging plates is swung down into alignment with the other pair thereof to shear off the ends of the film section, leaving a portion of the sheared ends overlapping.

14. A film-splicing apparatus comprising a base member, a pair of film-clamping assemblies which are normally disposed in alignment so as to receive the end portions of film which is to be spliced with the free ends thereof overlapped, each of said clamping assembly comprising a bottom clamping plate and a top clamping plate, said top clamping plate being mounted to hinge on corresponding side edges between open and closed positions, a carriage for one of said clamping assemblies, means mounting said carriage for linear movement laterally of the associated clamping assembly, said associated clamping assembly being mounted to hinge as a unit about the hinge axis of the top clamping plate thereof to an out-of-the-way position, a film trimming and emulsion scraping device mounted in the path of the free end of a film portion which is clamped in the laterally movable film-clamping assembly, the film-engaging plates of said movable clamping assembly having their inner ends offset so that the end portion of one clamping plate provides a surface for supporting the film clamped therein as it is moved past said film-trimming and emulsion-scraping device whereby upon predetermined lateral movement of said carriage the end of the film in the clamping assembly will be trimmed and simultaneously scraped so as to remove the emulsion in the area adjacent the trimmed end and said associated film clamping assembly having film-engaging plates with their inner ends offset and provided with film-cutting edges so as to cooperate with the ends of the corresponding plates on the movable clamping assembly in a final trimming of the free ends of the film when said associated film-clamping assembly is hinged from an out-of-the-way position to a position in alignment with the movable film-clamping assembly whereby the trimmed ends of the film overlap for forming a splice in the area which has been scraped to remove the emulsion.

* * * * *